United States Patent
Chan et al.

(10) Patent No.: US 7,307,733 B2
(45) Date of Patent: Dec. 11, 2007

(54) OPTICAL IMAGE MEASURING APPARATUS AND OPTICAL IMAGE MEASURING METHOD

(75) Inventors: Kinpui Chan, Yamagata (JP); Masahiro Akiba, Yamagata (JP)

(73) Assignee: Kabushiki Kaisha Topcon, Tokyo (JP)

( * ) Notice: Subject to any disclaimer, the term of this patent is extended or adjusted under 35 U.S.C. 154(b) by 164 days.

(21) Appl. No.: 11/194,482

(22) Filed: Aug. 2, 2005

(65) Prior Publication Data

US 2006/0028652 A1 Feb. 9, 2006

(30) Foreign Application Priority Data

Aug. 3, 2004 (JP) ............................. 2004-226923

(51) Int. Cl.
*G01B 9/02* (2006.01)

(52) U.S. Cl. .................................... 356/489

(58) Field of Classification Search ................ 356/486, 356/487, 489, 497
See application file for complete search history.

(56) References Cited

U.S. PATENT DOCUMENTS

| | | | | |
|---|---|---|---|---|
| 5,949,546 | A * | 9/1999 | Lee et al. | 356/492 |
| 6,806,963 | B1 * | 10/2004 | Walti et al. | 356/497 |
| 6,900,899 | B2 * | 5/2005 | Nevis | 356/484 |
| 7,038,788 | B2 * | 5/2006 | Matsumoto | 356/484 |

FOREIGN PATENT DOCUMENTS

JP 3245135 10/2001
JP 2001-330558 11/2001

OTHER PUBLICATIONS

New Technology Communications (2003), p. 2; "Optical Heterodyne Technology (revised edition)".
Kogaku (Japanese Journal of Optics), vol. 28- No. 3, 116(1999).
Electronics letters, vol. 30, 1753, (1994).

* cited by examiner

*Primary Examiner*—Michael A. Lyons
(74) *Attorney, Agent, or Firm*—Edwards Angell Palmer & Dodge LLP

(57) ABSTRACT

An apparatus, which includes a light source, a polarizing plate for converting the light beam to linearly polarized light, a half mirror for dividing the light beam into signal light and reference light and superimposing the signal light and the reference light on each other to produce interference light, a wavelength plate for converting the reference light to circularly polarized light, a frequency shifter for shifting a frequency of the reference light, a reference mirror which is moved by a piezoelectric element, a polarization beam splitter for extracting an S-polarized light component and a P-polarized light component from the interference light, CCDs for detecting the respective polarized light components and outputting detection signals, and portion for calculating a signal intensity of the interference light and a phase thereof based on the detection signals. An image of an object to be measured is formed based on a result obtained by calculation.

30 Claims, 5 Drawing Sheets

OPTICAL IMAGE MEASURING APPARATUS AND OPTICAL IMAGE MEASURING METHOD

The Japanese Priority Application (Japanese Application No. 2004-226923, filed August 3, 2004), upon which this U.S. patent application is based, is hereby incorporated by reference into this U.S. patent application.

BACKGROUND OF THE INVENTION

1. Field of the Invention

The present invention relates to an optical image measuring apparatus that applies a light beam to an object to be measured, particularly a light scattering medium, and produces a surface form or inner form of the object to be measured by detecting a reflected light beam or a transmitted light beam. In particular, the present invention relates to an optical image measuring apparatus for measuring the surface form or inner form of the object to be measured by using an optical heterodyne detection method to produce the image of the measured form.

2. Description of the Related Art

In recent years, attention has been given to optical imaging technique that produces an image of a surface or inner portion of an object to be measured using a laser light source or the like. This optical imaging technique is not hazardous to human bodies in contrast to the conventional X-ray CT. Therefore, the development of applications in the medical field has been particularly expected.

An example of a typical method of the optical imaging technique is a low coherent interference method (also called 'optical coherence tomography' or the like). This method uses the low coherence of a broad-band light source having a broad spectral width, such as a super luminescent diode (SLD). According to this method, reflection light from an object to be measured or light transmitted therethrough can be detected at superior distance resolution on the order of μm (for example, see Naohiro Tanno, "Kogaku" (Japanese Journal of Optics), Volume 28, No. 3, 116 (1999)).

FIG. 5 shows a basic structure of a conventional optical image measuring apparatus based on a Michelson interferometer, as an example of an apparatus using the low coherent interference method. An optical image measuring apparatus 100 includes a broad-band light source 101, a mirror 102, a beam splitter 103, and a photo detector 104. An object to be measured 105 is made of a scattering medium. A light beam from the broad-band light source 101 is divided by the beam splitter 103 into two, that is, reference light R propagating to the mirror 102 and signal light S propagating to the object to be measured 105. The reference light R is light reflected by the beam splitter 103. The signal light S is light transmitted through the beam splitter 103.

Here, as shown in FIG. 5, a propagating direction of the signal light S is set as a z-axis direction and a plane orthogonal to the propagating direction of the signal light S is defined as an x-y plane. The mirror 102 is movable in a direction indicated by a double-headed arrow in FIG. 5 (z-scanning direction).

The reference light R is subjected to a Doppler frequency shift through when reflected by the z-scanning mirror 102. On the other hand, the signal light S is reflected from the surface of the object to be measured 105 and from the inner layers thereof when the object to be measured 105 is irradiated with the signal light S. The object to be measured 105 is made of the scattering medium, so reflection light of the signal light S may be a diffusing wave having random phases. The signal light propagating through the object to be measured 105 and the reference light that propagates through the mirror 102 to be subjected to the frequency shift are superimposed on each other by the beam splitter 103 to produce interference light.

In the image measurement using such a low coherent interference method, interference occurs only when a difference in optical path length between the signal light S and the reference light R is within the coherence length (coherent distance) on the order of μm of the light source. In addition, only the component of the signal light S whose phase is correlated to that of the reference light R interferes with the reference light R. That is, only the coherent signal light component of the signal light S selectively interferes with the reference light R. Based on their principles, the position of the mirror 102 is shifted by the z-scanning to vary the optical path length of the reference light R, so that a reflectance profile of the inner layers of the object to be measured 105 is measured. The object to be measured 105 is also scanned with the irradiated signal light S in an x-y plane direction. The interference light is detected by the photo detector 104 during such scanning in the z-direction and the x-y plane direction. An electrical signal (heterodyne signal) outputted as a detection result is analyzed to obtain a two-dimensional sectional image of the object to be measured 105 (see Naohiro Tanno, "Kogaku" (Japanese Journal of Optics), Volume 28, No. 3, 116 (1999)).

Assume that an intensity of the reference light R and an intensity of the signal light S which are superimposed by the beam splitter 103 are given by $I_r$ and $I_s$, respectively, and a frequency difference between the reference light R and the signal light S and a phase difference therebetween are given by $f_{if}$ and $\Delta\theta$, respectively. In this case, a heterodyne signal as expressed by the following expression is outputted from the photo detector (for example, see Yoshizawa and Seta "Optical Heterodyne Technology (revised edition)", New Technology Communications (2003), p. 2).

Expression (1)

$$i(t) \propto I_r + I_s + 2\sqrt{I_r I_s}\cos(2\pi f_{if} t + \Delta\theta) \quad (1)$$

The third term of the right side of the expression (1) indicates an alternating current electrical signal and the frequency $f_{if}$ thereof is equal to the frequency of beat caused from the interference between the reference light R and the signal light S. The frequency $f_{if}$ of an alternating current component of the heterodyne signal is called a beat frequency or the like. The first and second terms of the right side of the expression (1) indicate the direct current components of the heterodyne signal and correspond to a signal intensity of background light of interference light.

However, when the two-dimensional cross sectional image is obtained by the conventional low coherent interference method, it is necessary to scan the object to be measured 105 with a light beam and to successively detect reflection light waves from respective regions of the object to be measured 105 in a depth direction (z-direction) and a sectional direction (x-y plane direction). Therefore, the measurement of the object to be measured 105 requires a long time. In addition, it is hard to shorten a measurement time in view of measurement fundamentals.

In views of such problems, an optical image measuring apparatus for shortening a measurement time has been proposed. FIG. 6 shows a fundamental structure of an example of such an apparatus. As shown in FIG. 6, an optical image measuring apparatus 200 includes a broadband light source 201, a mirror 202, a beam splitter 203, a two-dimensional photo sensor array 204 serving as a photo detector, and lenses 206 and 207. A light beam emitted from the light source 201 is converted into a parallel light flux by the lenses 206 and 207 and a beam diameter thereof is widened thereby. Then, the parallel light flux is divided into two, that is, the reference light R and the signal light S by the beam splitter 203. The reference light R is subjected to Doppler frequency shift through z-scanning with the mirror 202. On the other hand, the signal light S is incident on the object to be measured 205 over a broad area of the x-y plane because the beam diameter is widened. Therefore, the signal light S becomes reflection light including information related to the surface and inner portion of the object to be measured 205 over a wide area. The reference light R and the signal light S are superimposed on each other by the beam splitter 203 and detected by elements (photo sensors) arranged in parallel on the two-dimensional photo sensor array 204. Thus, it is possible to obtain a two-dimensional cross sectional image of the object to be measured 205 in real time without light beam scanning.

An apparatus described in K. P. Chan, M. Yamada, and H. Inaba, "Electronics Letters", Vol. 30, 1753 (1994) has been known as such a non-scanning type optical image measuring apparatus. In the apparatus described in the same document, a plurality of heterodyne signals outputted from a two-dimensional photo sensor array are inputted to signal processing systems arranged in parallel to detect the amplitude and phase of each of the heterodyne signals.

However, when the spatial resolution of an image is increased, it is necessary to increase a number of elements of the array. In addition, it is necessary to prepare a signal processing system including a number of channels corresponding to the number of elements. Therefore, it is supposedly hard to actually use the apparatus in fields that require a high resolution image, such as a medical field and an industrial field.

Thus, the inventors of the present invention have proposed the following non-scanning type optical image measuring apparatus in JP 2001-330558 A (claims and specification paragraphs [0044] and [0072] to [0077]). The optical image measuring apparatus according to this proposal includes a light source for emitting a light beam, an interference optical system, and a signal processing portion. In the interference optical system, the light beam emitted from the light source is divided into two, that is, signal light propagating through an examined object arrangement position in which an object to be examined is arranged and reference light propagating on an optical path different from an optical path passing through the examined object arrangement position. The signal light propagating through the examined object arrangement position and the reference light propagating on the different optical path are superimposed on each other to produce interference light. The interference optical system includes a frequency shifter, light cutoff devices, and photo sensors. The frequency shifter shifts a frequency of the signal light and a frequency of the reference light relative to each other. In order to receive the interference light in the interference optical system, the interference light is divided into two parts. The light cutoff devices periodically cut off the two divided parts of the interference light to generate two interference light pulse trains with a phase difference of 90 degrees therebetween. The photo sensors respectively receive the two interference light pulse trains. The photo sensors each have a plurality of light receiving elements which are spatially arranged and separately detect light receiving signals. The signal processing portion combines the plurality of light receiving signals detected by the photo sensors to generate signals of the signal light which correspond to respective points of interest of a surface or inner layers of the object to be examined which is arranged in the examined object arrangement position on a propagating path of the signal light.

In the optical image measuring apparatus, the interference light in which the reference light and the signal light interfere with each other is divided into two parts. The two parts of the interference light are received by the two photo sensors (two-dimensional photo sensor arrays) and respectively sampled by the light cutoff devices (shutters) disposed in front of both sensor arrays. A phase difference of $\pi/2$ is set between sampling periods of the two divided parts of the interference light. Therefore, an intensity of the signal light and an intensity of the reference light which compose background light of the interference light and phase quadrature components (sine component and cosine component) of the interference light are detected. In addition, an intensity of the background light included in outputs from both the sensor arrays is subtracted from the outputs of both the sensor arrays to calculate two phase quadrature components of the interference light. An amplitude of the interference light is obtained based on the calculation result.

However, according to the optical image measuring apparatus described in JP 2001-330558 A (claims, specification paragraphs [0068] to [0084], and FIG. 1), it is necessary that the interference light be divided into a plurality of optical paths, the light cutoff device be provided on each of the optical paths, and separate interference light beams be sampled while the respective light cutoff devices are synchronized with one another. Therefore, an apparatus structure and control are complicated and it is likely to increase a cost. When a transmission type shutter such as a liquid crystal shutter is used as the light cutoff device, a signal loss of each of the interference light beams may be increased to reduce the detection sensitivity of each of the interference light beams, so it is likely to deteriorate the sensitivity of measurement.

An available image sensor such as a charge-coupled device (CCD) camera has been widely used for the two-dimensional photo sensor array of the optical image measuring apparatus as described above. However, up to now, a problem has been recognized that a currently available CCD camera cannot follow the beat frequency of a heterodyne signal which is on the order of several kHz to several MHz because of the low frequency response characteristic thereof. The feature of the optical image measuring apparatus which is proposed by the inventors of the present invention and described in JP 2001-330558 A is to perform the measurement using the low frequency response characteristic based on the sufficient understanding of the problem.

SUMMARY OF THE INVENTION

The present invention has been made in view of the above-mentioned circumstances. An object of the present invention is to provide an optical image measuring apparatus capable of measuring an object to be measured based on a signal intensity of the interference light and phase information thereof which are obtained with high precision by improving the detection sensitivity of interference light and an optical image measuring method for the optical image measuring apparatus.

Another object of the present invention is to provide an optical image measuring apparatus in which an apparatus structure and a control mode are simplified without using a light cutoff device (shutter) for sampling the interference light and an optical image measuring method for the optical image measuring apparatus.

To achieve the above-mentioned objects, an optical image measuring apparatus according to a first aspect of the present invention includes: light beam outputting means for outputting a light beam whose intensity is periodically modulated; a first converting means for converting a polarization characteristic of the light beam to linear polarization; dividing means for dividing the light beam into signal light propagating through an object to be measured and reference light propagating through a reference object; a second converting means for converting a polarization characteristic of one of the signal light and the reference light, which is linearly polarized light; frequency shifting means for shifting a frequency of the signal light and a frequency of the reference light relative to each other by an amount substantially equal to a frequency for intensity modulation of the light beam; superimposing means for superimposing the signal light propagating through the object to be measured and the reference light propagating through the reference object on each other to produce the first interference light, the signal light and the reference light respectively having a polarization characteristic converted by the first converting means and the second converting means in each of which the frequency is shifted by the frequency shifting means; extracting means for extracting a plurality of polarized light components from the produced first interference light; a first detecting means for detecting the polarized light components extracted from the first interference light; and calculating means for calculating one of a signal intensity and a phase of the first interference light based on the detected polarized light components, in which an image of the object to be measured is formed based on the calculated one of the signal intensity and the phase of the first interference light.

According to a second aspect of the present invention, in the optical image measuring apparatus of the first aspect of the present invention, the first detecting means includes a storage type photo sensor for detecting the polarized light components extracted from the first interference light at a predetermined response frequency.

According to a third aspect of the present invention, in the optical image measuring apparatus of the first aspect of the present invention, the first detecting means includes a CCD camera.

According to a fourth aspect of the present invention, in the optical image measuring apparatus of the second aspect of the present invention, the frequency for the intensity modulation of the light beam is set such that a difference between the frequency for the intensity modulation thereof and a frequency of the first interference light becomes sufficiently smaller than a response frequency of the first detecting means.

According to a fifth aspect of the present invention, in the optical image measuring apparatus of the first aspect of the present invention, the first converting means includes a polarizing plate for transmitting an oscillation component of the light beam in a predetermined direction.

According to a sixth aspect of the present invention, in the optical image measuring apparatus of the first aspect of the present invention, the second converting means includes a wavelength plate for applying a phase difference between a P-polarized light component and an S-polarized light component of the one of the signal light and the reference light, which is the linearly polarized light, to convert the polarization characteristic thereof, the P-polarized light component and the S-polarized light component being orthogonal to each other.

According to a seventh aspect of the present invention, in the optical image measuring apparatus of the first aspect of the present invention, the first converting means converts the polarization characteristic of the light beam to the linear polarization in an angle direction by 45° relative to an x-axis and a y-axis of an xy-plane which are orthogonal to a propagating direction of the light beam, and the second converting means converts the polarization characteristic of the one of the signal light and the reference light, which is the linearly polarized light in the direction forming an angle by 45°, to circular polarization.

According to a tenth aspect of the present invention, in the optical image measuring apparatus of the seventh aspect of the present invention, the extracting means extracts a P-polarized light component and an S-polarized light component which are orthogonal to each other from the first interference light.

According to an eleventh aspect of the present invention, in the optical image measuring apparatus of the first aspect of the present invention, the reference object includes a reference mirror having a reflective surface, which is located orthogonal to an optical path of the reference light, the dividing means and the superimposing means compose a half mirror tilted relative to an optical path of the outputted light beam, an optical path of the signal light, and an optical path of the reference light, and the object to be measured, the reference mirror, and the half mirror compose a Michelson type interferometer.

According to a twelfth aspect of the present invention, in the optical image measuring apparatus of the ninth aspect of the present invention, the first converting means includes a polarization plate for transmitting an oscillation component of the light beam which is oscillated in the direction forming an angle by 45° relative to the x-axis and the y-axis of the xy-plane which are orthogonal to the propagating direction of the light beam, the half mirror divides the light beam which is converted to the linearly polarized light by the polarization plate into the signal light and the reference light, and the second converting means includes a ⅛-wavelength plate which is provided between the half mirror and the reference mirror and applies a phase difference of π/4 between a P-polarized light component and an S-polarized light component of the reference light, which are orthogonal to each other, before and after reflection on the reference mirror to convert a polarization characteristic of the reference light from the linear polarization to circular polarization.

According to a thirteenth aspect of the present invention, in the optical image measuring apparatus of the tenth aspect of the present invention, the extracting means includes a polarization beam splitter for transmitting a P-polarized light component of the first interference light and reflecting an S-polarized light component thereof.

According to a fourteenth aspect of the invention, in the optical image measuring apparatus of the first aspect of the present invention, the frequency shifting means includes a frequency shifter provided on an optical path of the reference light.

According to a fifteenth aspect of the invention, in the optical image measuring apparatus of the eleventh aspect of the present invention, the frequency shifting means includes a frequency shifter provided on an optical path of the reference light.

According to a sixteenth aspect of the present invention, in the optical image measuring apparatus of the ninth aspect of the present inventions, the frequency shifting means includes the reference mirror and driving means for continuously moving the reference mirror in an optical path direction of the reference light.

According to seventeenth and eighteenth aspects of the present invention, in the optical image measuring apparatus of the first and tenth aspects of the present invention, the frequency shifting means includes a frequency shifter provided on an optical path of the reference light, and the optical image measuring apparatus further includes: driving means for moving the reference mirror in an optical path direction of the reference light; and drive control means for controlling the driving means so as to move the reference mirror stepwise in synchronization with the intensity modulation of the light beam which is performed in the light beam outputting means.

According to a nineteenth aspect of the present invention, in the optical image measuring apparatus of the thirteenth aspect of the present invention, the driving means includes a piezoelectric element provided on a rear surface of the reference mirror which is opposed to the reflective surface thereof.

According to twentieth and twenty-first aspects of the present invention, in the optical image measuring apparatus of the first and tenth aspects of the present invention, the light beam outputting means includes: a laser light source for emitting laser light; an interference optical system for dividing the emitted laser light into first laser light propagating through the frequency shifting means and second laser light propagating through a reflecting mirror which is fixedly located and superimposing the first laser light subjected to frequency shift and the second laser light reflected on the reflecting mirror on each other to produce second interference light; a second detecting means for detecting the produced second interference light and outputting an electrical signal having a frequency equal to that of the detected second interference light; pulse generating means for generating a pulse signal having a frequency equal to that of the outputted electrical signal; and a light source which is driven based on the generated pulse signal and outputs a pulsed light beam having a repetition frequency equal to that of the generated pulse signal.

According to twenty-second and twenty-third aspects of the present invention, in the optical image measuring apparatus of the first and tenth aspects of the present invention, the light beam outputting means includes: pulse generating means for generating a pulse signal having a repetition frequency substantially equal to an amount of shift of the frequency shifted by the frequency shifting means; and a light source which is driven based on the pulse signal and outputs a pulsed light beam.

An optical image measuring method according to a thirtieth aspect of the present invention, includes: a light beam outputting step of outputting a light beam whose intensity is periodically modulated; a first converting step of converting a polarization characteristic of the output light beam to linear polarization; a dividing step of dividing the converted light beam into signal light propagating through an object to be measured and reference light propagating through a reference object; a second converting step of converting a polarization characteristic of one of the signal light and the reference light; a frequency shifting step of shifting a frequency of the signal light and a frequency of the reference light relative to each other by an amount substantially equal to a frequency for intensity modulation of the light beam; a superimposing step of superimposing the signal light propagating through the object to be measured and the reference light propagating through the reference object on each other to produce the first interference light, each of which has a polarization characteristic converted in the first converting step and the second converting step in which the frequency is shifted by a frequency shifting step; an extracting step of extracting a plurality of polarized light components from the produced interference light; a detecting step of detecting the polarized light components extracted from the interference light; and a calculating step of calculating one of a signal intensity and a phase of the first interference light based on the detected polarized light components, in which an image of the object to be measured is formed based on the calculated one of the signal intensity and the phase of the first interference light.

According to the present invention, the light beam whose intensity is periodically modulated is outputted. The signal light and the reference light in which the polarization characteristics thereof are different from each other are obtained from the light beam and superimposed on each other to produce the first interference light. The plurality of different polarized light components extracted from the first interference light are detected. The signal intensity or the phase of the first interference light is calculated based on the result obtained by detection to form the image of the object to be measured. As a result, as compared with a conventional case, it is unnecessary to provide a light cutoff device (such as particularly a transmission type high-speed shutter) for sampling the first interference light. Therefore, there is no attenuation in intensity of the first interference light which is caused by the light cutoff device, so the detection sensitivity of the first interference light is improved. Thus, the signal intensity of the first interference light and the phase information thereof can be obtained with high precision, so that it is possible to suitably measure the object to be measured.

As compared with a conventional case, it is unnecessary to provide a shutter on each of the plurality of separated optical paths of the first interference light for sampling, and it is unnecessary to control synchronization between the plurality of shutters. Therefore, the apparatus structure and the control mode can be simplified.

BRIEF DESCRIPTION OF THE DRAWINGS

In the accompanying drawings:

FIGS. 2A to 2D are explanatory graphs showing interference light detection modes of the optical image measuring apparatus according to the first embodiment of the present invention, in which FIG. 2A is a graph showing a time waveform of a light beam whose intensity is modulated and which is outputted from a broad-band light source, FIG. 2B is a graph showing a time waveform of an S-polarized light element of interference light in the case where the light beam outputted from the broad-band light source is continuous light, FIG. 2C is a graph showing a time waveform of a P-polarized light element of the interference light in the case where the light beam outputted from the broad-band light source is the continuous light, FIG. 2D is a graph showing a time waveform of the S-polarized light element of the interference light in the case where the intensity of the light beam outputted from the broad-band light source is modulated, and FIG. 2E is a graph showing a time waveform of the P-polarized light element of the interference light in the case where the intensity of the light beam outputted from the broad-band light source is modulated;

DETAILED DESCRIPTION OF THE PREFERRED EMBODIMENTS

Hereinafter, an example of an optical image measuring apparatus according to each of preferred embodiments of the present invention will be described in detail with reference to the accompanying drawings.

First Embodiment

[Structure of Apparatus]

Figure 1:
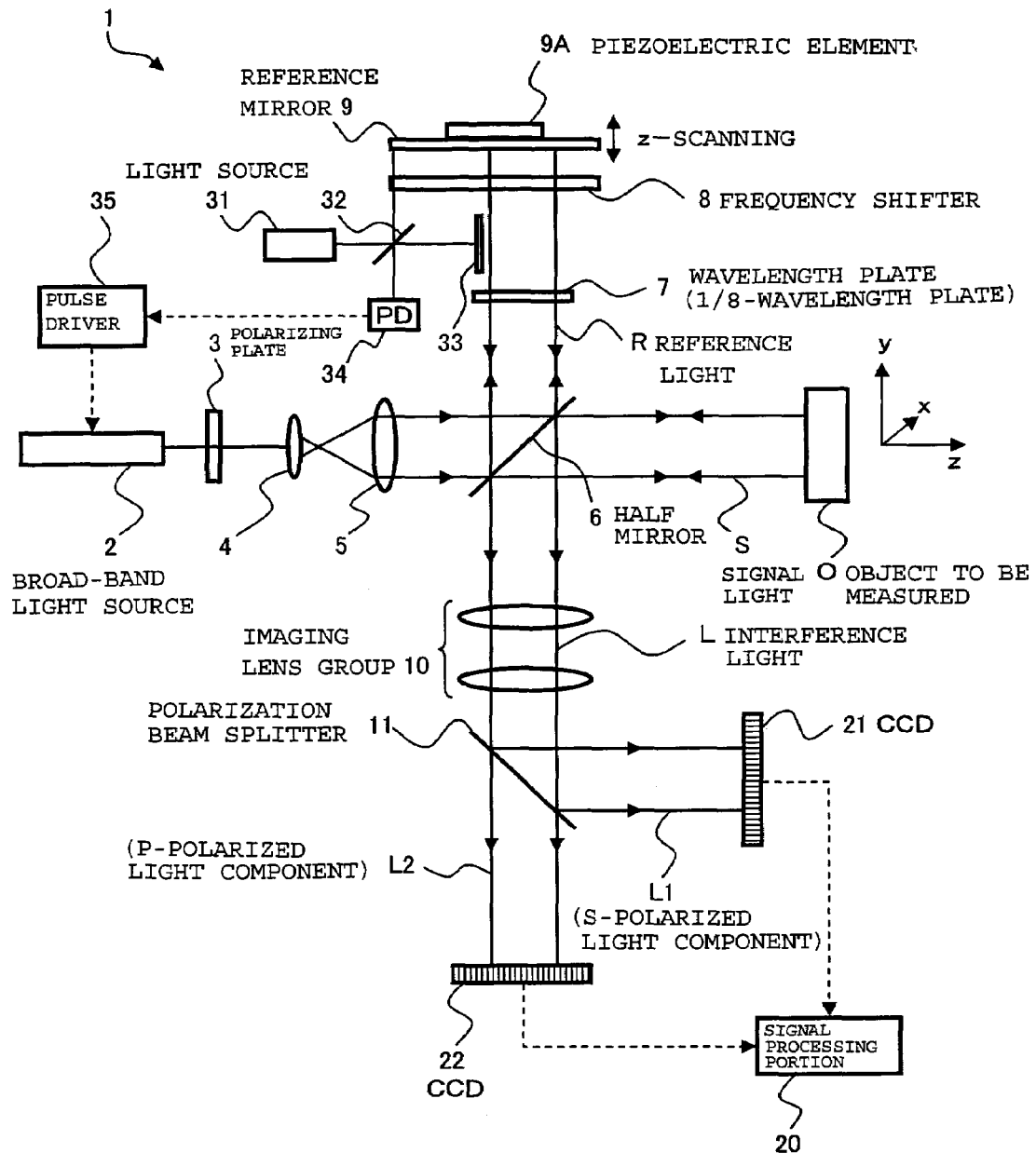
FIG. 1 is a schematic diagram showing an example of an optical image measuring apparatus according to a first embodiment of the present invention.

FIG. 1 shows a schematic structure of an optical image measuring apparatus 1 according to a first embodiment of the present invention. The optical image measuring apparatus 1 is an apparatus available to measure a sectional image and a surface image of an object to be measured O, for example, in the medical field and the industrial field. The object to be measured O is an object which is made of a scattering medium such as a human eye, for example, in the medical field.

The optical image measuring apparatus 1 includes a broad-band light source 2 for outputting a low-coherent light beam, a polarizing plate 3 for converting a polarization characteristic of the light beam to linear polarization, lenses 4 and 5 for converting the light beam to a parallel light flux and increasing a beam diameter thereof, and a half mirror 6 for dividing the light beam into signal light S and reference light R and also superimposing the signal light S and the reference light R on each other to produce interference light L. The optical image measuring apparatus 1 further includes a wavelength plate 7 for converting a polarization characteristic of the reference light R from linear polarization to circular polarization, a frequency shifter 8 for shifting a frequency of the reference light R, a reference mirror 9 for totally reflecting the reference light R on a reflective surface orthogonal to a propagating direction of the reference light R, and a piezoelectric element 9A provided on a rear surface opposite to the reflective surface of the reference mirror 9. Note that the interference light L produced by the half mirror 6 corresponds to the "first interference light" in the present invention.

The broad-band light source 2 corresponds to a "light source" in the present invention and is composed of an SLD, a light-emitting diode (LED), or the like. A coherent length of an available near-infrared region SLD is about 30 μm and a coherent length of an LED is about 10 μm.

In an xyz-coordinate system shown in FIG. 1, a propagating direction of the light beam outputted from the broad-band light source 2 is defined as a z-axis direction and an oscillation plane of the light beam orthogonal to the propagating direction thereof is defined as an xy-plane. The x-axis direction and y-axis direction are defined so as to align with an oscillation plane of an electric field component of the light beam and an oscillation plane of a magnetic field component thereof, respectively.

The polarizing plate 3 corresponds to the "first converting means" in the present invention and is a polarization conversion element for transmitting an oscillation component of the light beam in a predetermined direction, which is outputted from the broad-band light source 2. In this embodiment, the polarizing plate 3 is constructed to transmit an oscillation component in an angle direction by 45° with respect to an x-axis (and a y-axis) of the xy-plane. The light beam passing through the polarizing plate 3 has linearly polarized light by 45°. Therefore, the amplitudes of polarization components of the light beam in the x-axis direction and the y-axis direction are equal to each other. In other words, the amplitude of a P-polarized light component of the light beam is equal to that of a S-polarized light component thereof.

The half mirror 6 composes the "dividing means" in present invention, for dividing the linearly polarized, parallel beam into the signal light S propagating to the object to be measured O and the reference light R propagating to the reference mirror 9. The half mirror 6 transmits a part (half) of the light beam as the signal light S and reflects the rest thereof as the reference light R.

The half mirror 6 composes the "superimposing means" in the present invention as well, which reflects a part of the signal light S propagating through the object to be measured O, and transmits a part of the reference light R propagating through the reference mirror 9, so that the signal light S and the reference light R are superimposed to produce the interference light L.

In this embodiment, because a Michelson interferometer is used, the dividing means and the superimposing means each are composed of (different reflective surface of) the same half mirror 6. On the other hand, when another type of interferometer such as a Mach-Zehnder interferometer is employed, an optical element composing the dividing means may be different from that composing the superimposing means. An arbitrary non-polarization beam splitter having no influence on the polarization characteristics of the light beams (signal light S and reference light R) is applied to each of the dividing means and the superimposing means.

The wavelength plate 7 composes the "second converting means" in the present invention and is a polarization conversion element for converting the polarization characteristic of the reference light R from linear polarization to circular polarization. In this embodiment, a ⅛-wavelength plate is used as the wavelength plate 7. Therefore, when the reference light R passes through the wavelength plate 7, a phase difference between the P-polarized light component and the S-polarized light component becomes $\pi/4$. In each of the case where the reference light R propagates from the half mirror 6 to the reference mirror 9 and the case where the reference light R is reflected by the reference mirror 9 and transferred to the half mirror 6 again, the above-mentioned phase difference is applied to the reference light R. As a result, a phase difference of $\pi/2$ is applied to the reference light R. Thus, the wavelength plate 7 acts on the reference light R having linearly polarized light by 45° in the same manner as the ¼-wavelength plate, so the reference light R which is incident on the half mirror 6 again is converted to circularly polarized light. When another interferometer such as the Mach-Zehnder interferometer is used as described above, it is possible to apply the ¼-wavelength plate.

The frequency shifter 8 composes the "frequency shifting means" in the present invention, imposing a frequency shift to the reference light R. The frequency shifter 8 is composed of, for example, an optoelectronic modulator or an acoustooptic modulator. As described later, it is possible to remove the frequency shifter 8 from the optical image measuring apparatus according to the present invention. In such a case, the frequency of the reference light R is shifted by moving the reference mirror 9.

The reference mirror 9 composes a "reference object" in the present invention and is moved in an optical path direction of the reference light R to extract reflection light of the signal light S at each depth (z-coordinate) of the object to be measured O. More specifically, because the light beam from the broad-band light source 2 is the low-coherent light, only the signal light S propagating a distance substantially equal to a propagating distance of the reference light R is useful to produce the interference light L. In other words, only reflection light on the object to be measured O at a z-position which is located at a distance substantially equal to a distance to the reference mirror 9 with respect to the half mirror 6 interferes with the reference light R to produce the interference light L. Therefore, the position of the reference mirror 9 is varied (z-scanning is performed) to continuously extract interference signal on a region of the object to be measured O at each z-coordinate.

The reference mirror 9 is continuously moved in the optical path direction of the reference light R by the piezoelectric element 9A so as to act to shift the frequency of the reference light R. Frequency shift applied by the movement of the reference mirror 9 is called Doppler frequency shift in some cases. In this time, the piezoelectric element 9A composes "driving means" in the present invention. The reference mirror 9 and the piezoelectric element 9A compose "frequency shifting means" in the present invention. Although will be described in detail in a second embodiment, it is possible to employ a structure in which the reference mirror 9 and the piezoelectric element 9A are not used for frequency shift.

The optical image measuring apparatus 1 according to this embodiment further includes an imaging lens group 10 for imaging the interference light L produced by the half mirror 6 serving as the superimposing means, a polarization beam splitter 11 for dividing an optical path of the interference light L into two according to a polarization characteristic thereof, CCDs (cameras) 21 and 22 provided on respective optical paths into which the optical path of the interference light L is divided, and a signal processing portion 20 for processing respective results obtained by detection with the CCD 21 and 22.

The polarization beam splitter 11 composes an "extracting means" in the present invention, for extracting a plurality of difference polarization components of the interference light L. More specifically, the polarization beam splitter 11 acts to reflect an S-polarized light component L1 of the interference light L to allow the reflected S-polarized light component L1 to enter the CCD 21 and to transmit a P-polarized light component L2 thereof to allow the transmitted P-polarized light component L2 to enter the CCD 22. The amplitude (that is, maximum intensity) of S-polarized light component L1 of the interference light L is equal to that of the P-polarized light component L2 thereof.

The CCDs 21 and 22 compose "first detecting means" in the present invention and each are a storage type two-dimensional photo sensor array for interference light detection. The CCD 21 detects the S-polarized light component L1 of the interference light L extracted by the polarization beam splitter 11, performs photoelectric conversion to generate a detection signal, and outputs the detection signal to the signal processing portion 20. Similarly, the CCD 22 detects the extracted P-polarized light component L2 of the extracted interference light L, performs photoelectric conversion to generate a detection signal, and outputs the detection signal to the signal processing portion 20. Each of the detection signals outputted from the CCDs 21 and 22 is the above-mentioned heterodyne signal.

The signal processing portion 20 is "calculating means" in the present invention, for executing calculation processing described later based on the detection signals outputted from the CCDs 21 and 22. The signal processing portion 20 analyzes a result obtained by the calculation processing to form various images including a two-dimensional sectional image of the object to be measured O and causes a display device such as a monitor device (not shown) to display the images. The signal processing portion 20 is composed of, for example, a computer which includes a storage device storing a predetermined calculation program, such as a ROM, and a calculation control device executing the calculation program, such as a CPU.

The optical image measuring apparatus 1 according to this embodiment further includes a light source 31, a beam splitter 32, a reflecting mirror 33, a photo detector (PD) 34, and a pulse driver 35 in order to modulate the amplitude of the light beam from the broad-band light source 2 while frequency shift applied to the reference light R is monitored.

The light source 31 corresponds to a "laser light source" in the present invention and is composed of, for example, a laser diode for emitting laser light having a coherent length longer than that of the light beam from the broad-band light source 2. The beam splitter 32 divides the laser light from the light source 31 into first laser light (reflection light) propagating through the frequency shifter 8 and the reference mirror 9 and second laser light (transmission light) propagating through the reflecting mirror (fixed mirror) 33 disposed to be fixed. Then, the beam splitter 32 superimposes the first laser light which has been subjected to frequency shift by the frequency shifter 8 or the like and the second laser light reflected on the reflecting mirror 33 on each other to produce interference light. The beam splitter 32, the reflecting mirror 33, and the reference mirror 9 compose an "interference optical system" in the present invention. The interference light produced by the interference optical system corresponds to "second interference light".

The photo detector 34 composes "second detecting means" in the present invention. The photo detector 34 detects the interference light produced by the interference optical system and outputs an electrical signal having a frequency equal to that of the interference light. The pulse driver 35 composes "pulse generating means" in the present invention. The pulse driver 35 generates a pulse signal having a frequency equal to that of the electrical signal outputted from the photo detector 34 and outputs the pulse signal to the broad-band light source 2.

The broad-band light source 2 is driven with the pulse signal outputted from the pulse driver 35 and outputs a pulsed light beam having a repetition frequency equal to that of the pulse signal. At this time, the light beam from the broad-band light source 2 is outputted as, for example, pulsed light of a rectangular train with a duty of 50%.

The broad-band light source 2, the light source 31, the beam splitter 32, the reflecting mirror 33, the photo detector (PD) 34, and the pulse driver 35 compose "light beam outputting means" in the present invention.

[Measurement Mode]

Subsequently, a measurement mode with respect to the signal intensity of the interference light L and the spatial phase distribution thereof, that is, a measurement mode with respect to the signal intensity of the heterodyne signal and phase information thereof, which is executed by the optical image measuring apparatus 1 according to this embodiment will be described. The following detailed signal processing is executed by the signal processing portion 20 shown in FIG. 1.

The optical image measuring apparatus 1 according to this embodiment forms the signal light S and the reference light R whose polarization characteristics are different from each other and detects the interference light L of those as the heterodyne signal to obtain a surface image or a sectional image of the object to be measured O.

First, the basic principle of the measurement mode executed by the optical image measuring apparatus 1 will be described. The light beam outputted from the broad-band light source 2 is converted to the linearly polarized light in the direction forming an angle of 45° with respect to the x-axis by the polarizing plate 3. The beam diameter of the converted linearly polarized light is increased by the lenses 4 and 5 and the linearly polarized light whose beam diameter is increased is converted to the parallel light flux thereby. Then, the light is incident on the half mirror 6 and divided into two, that is, the signal light S and the reference light R.

The signal light S is incident on the object to be measured O made of a scattering medium and reflected on a surface thereof and sectional surfaces at various depths. A part of a reflection light wave from the object to be measured O is reflected on the half mirror 6 and transmitted to the imaging lens group 10.

On the other hand, the reference light R passes through the wavelength plate 7 and propagates to the reference mirror 9. At this time, the reference mirror 9 is being driven (z-scanning is being performed) in the propagation direction of the reference light R by the piezoelectric element 9A. The reference light R is subjected to frequency shift having a predetermined amount by the frequency shifter 8. A reflection light wave on the reference mirror 9 is subjected to Doppler frequency shift by the z-scanning of the reference mirror 9 and further subjected to frequency shift by the frequency shifter 8, and then passes through the wavelength plate 7. Here, because the polarization characteristic of the reference light R is the linearly polarized light by 45° and the wavelength plate 7 is the ⅛-wavelength plate, the polarization characteristic of the reference light R passing through the wavelength plate 7 two times is converted to the circular polarization. A part of the reference light R whose polarization characteristic is converted to the circular polarization passes through the half mirror 6 and transmitted to the imaging lens group 10.

At this time, the half mirror 6 superimposes the signal light S of the linear polarization, which is reflected on the object to be measured O, and the reference light R which is converted to the circularly polarized light by frequency shift on each other to produce the interference light L, thereby transmitting the interference light L to the imaging lens group 10. The interference light L is propagated to the polarization beam splitter 11 through the imaging lens group 10.

The polarization beam splitter 11 acts to reflect the S-polarized light component L1 of the interference light L and to transmit the P-polarized light component L2 thereof. The S-polarized light component L1 of the interference light L is detected by the CCD 21 and the P-polarized light component L2 thereof is detected by the CCD 22. The S-polarized light component L1 of the interference light L includes an S-polarized light component Ess of the signal light S and an S-polarized light component Ers of the reference light R. The P-polarized light component L2 of the interference light L includes a P-polarized light component Esp of the signal light S and a P-polarized light component Erp of the reference light R. The S-polarized light component Ess of the signal light S, the P-polarized light component Esp thereof, the S-polarized light component Ers of the reference light R, and the P-polarized light component Erp thereof each are expressed by the following expressions.

$$Ess = \sqrt{I_{ss}} \sin(2\pi ft + \phi) \tag{2}$$

$$Esp = \sqrt{I_{sp}} \sin(2\pi ft + \phi) \tag{3}$$

$$Ers = \sqrt{I_{rs}} \sin[2\pi(f + f_D)t + \phi'] \tag{4}$$

$$Erp = \sqrt{I_{rp}} \sin[2\pi(f + f_D)t + \phi' + 90°] \tag{5}$$

Here, f indicates a frequency of the light beam emitted from the broad-band light source 2, $f_D$ indicates a frequency shift, φ indicates an initial phase of the signal light S, and φ' indicates an initial phase of the reference light R. Assume that a difference between the initial phase of the signal light S and the initial phase of the reference light R is given by Δφ(=φ−φ'). Referring to the expressions (2) to (5), the S-polarized light component L1 of the interference light L and the P-polarized light component L2 thereof are detected by the CCDs 21 and 22 as heterodyne signals $i_1$ and $i_2$ expressed by the following expressions.

$$i_1 \propto |E_{ss} + E_{rs}|^2 \propto I_{rs} + I_{ss} + 2\sqrt{I_{rs}I_{ss}} \cos(2\pi f_D t + \Delta\phi) \tag{6}$$

$$i_2 \propto |E_{sp} + E_{rp}|^2 \propto I_{rp} + I_{sp} + 2\sqrt{I_{rp}I_{sp}} \sin(2\pi f_D t + \Delta\phi) \tag{7}$$

As is apparent from the comparison between the expressions (6) and (7), a phase difference between the alternating signals of the third terms of the respective expressions is 90° because of the cosine and sine functions with the same phase. In the present invention, in addition to utilizing such a feature, the light beams whose intensity is periodically modulated is used as measurement light to allow the realization of optical heterodyne detection without sampling processing using shutters, thereby measuring the signal intensity of the interference light L and the spatial phase distribution thereof. In a conventional optical image measuring technique, single interference light is sampled using a plurality of functions having different phases to detect cosine and sine components thereof. In contrast to this, the feature of the present invention is that the polarization characteristics of the reference light R and the signal light S are converted to produce the plurality of (two in this embodiment) interference light components having the different phases and the produced interference light components are separately detected. Hereinafter, measurement fundamentals in the present invention will be described.

In this embodiment, the light beam whose intensity is periodically modulated is outputted from the broad-band light source 2 using the light source 31, the beam splitter 32, the reflecting mirror 33, the photo detector (PD) 34, and the pulse driver 35.

The laser light outputted from the light source 31 is divided into an optical path in the reference mirror 9 direction (reflection laser light beam) and an optical path in the fixed mirror 33 direction (transmission laser light beam) by the beam splitter 32. The laser light beam on the optical path in the reference mirror 9 direction propagates through the frequency shifter 8 and the reference mirror 9 to be subjected to frequency shift by those and then is incident on the beam splitter 32 again. On the other hand, the laser light beam on the optical path in the fixed mirror 33 direction is incident, as reflection light on the fixed mirror 33, on the beam splitter 32 again (without frequency shift). The laser light beams propagating on both the optical paths are superimposed on each other by the beam splitter 33 to produce interference light. The interference light is detected by the photo detector 34.

As in the case of the reference light R, the interference light detected by the photo detector 34 is subjected to the frequency shift using the frequency shifter 8 and the Doppler frequency shift using the reference mirror 9, so the interference light is subjected to frequency shift having the amount of shift (substantially) equal to that of the reference light R. Therefore, the interference light has a beat frequency (substantially) equal to that of the interference light L produced from the signal light S and the reference light R.

The photo detector 34 outputs an electrical signal corresponding to the detected interference light to the pulse driver 35. As in the case of the heterodyne signal expressed by the expression (1), the electrical signal includes a direct current component and an alternating current component. The alternating current component has a frequency substantially equal to the beat frequency of the interference light L as described above. When receiving the electrical signal from the photo detector 34, the pulse driver 35 outputs a pulse signal having a frequency equal to that of the electrical signal to the broad-band light source 2. The broad-band light source 2 is driven based on the pulse signal outputted from the pulse driver 35 and outputs a pulsed light beam having a repetition frequency equal to that of the pulse signal.

As described above, in this embodiment, the amount of shift of the frequency shift which is applied to the reference light R is monitored and the object to be measured O is measured using a pulsed light beam having a pulse repetition frequency (substantially) equal to the amount of shift. As described above, the light beam from the broad-band light source 2 is outputted as, for example, pulsed light of a rectangular train with a duty of 50%. The duty ratio of the light beam is not limited to 50%. The pulse shape may be other than the rectangular train (for example, a triangular train or a trapezoidal train). For example, a light beam obtained by modulation between output intensities of 50 and 100 can be also applied instead of pulsed light obtained by switching between output intensities of 0 and 100. That is, the important point is not to control the modulation degree of the intensity of the light beam but to control a frequency for modulation of the intensity thereof such that the frequency becomes substantially equal to the beat frequency of the interference light L.

Next, a detection mode of the interference light L in the optical image measuring apparatus 1 according to this embodiment will be described with reference to graphs shown in FIGS. 2A to 2E. Hereinafter, assume that a modulation frequency of the intensity of the light beam outputted from the broad-band light source 2 is $f_m$. As described above, $f_D$ indicates the frequency shift applied to the reference light R (beat frequency of the interference light L). Assume that the modulation frequency $f_m$ of the light beam is equal to or closer to the frequency shift $f_D$.

Figure 2:
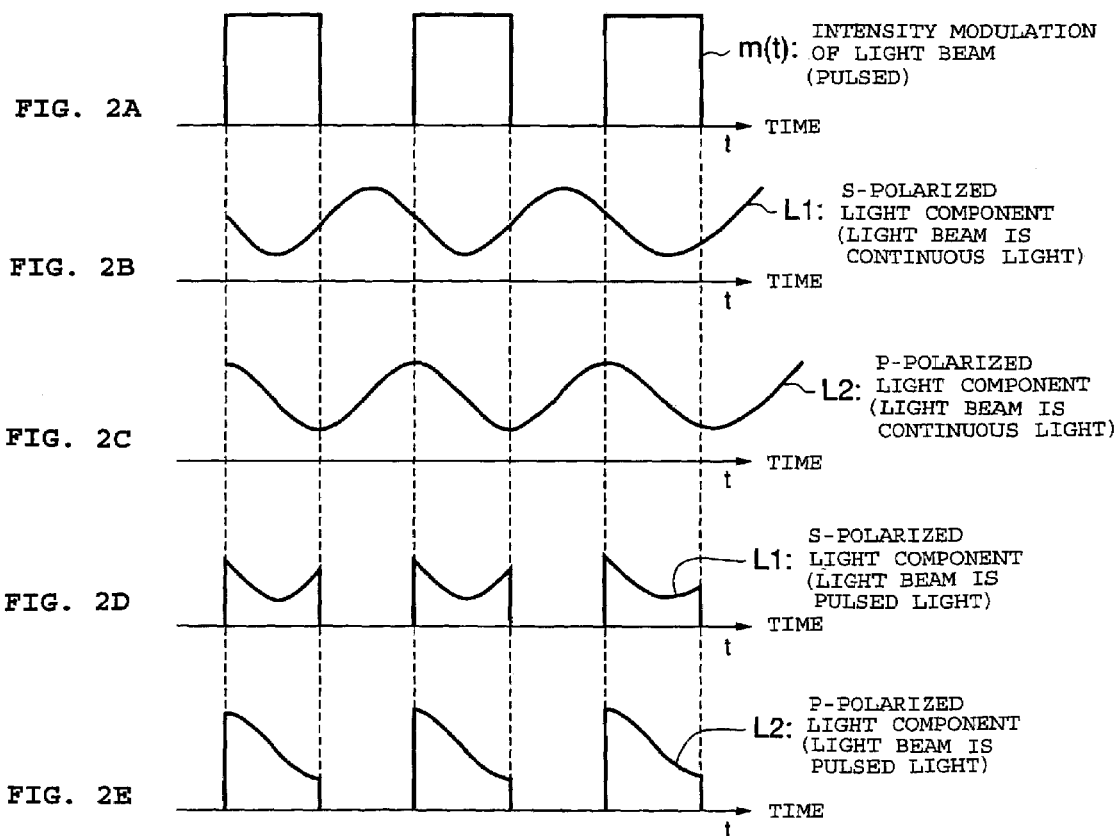

FIG. 2A shows a time waveform of a light beam which is subjected to intensity modulation at the modulation frequency $f_m$ and outputted from the broad-band light source 2. FIG. 2B shows a time waveform of the S-polarized light component L1 of the interference light L (beat frequency $f_D$) in the case where the light beam is continuous light and thus the reference light R and the signal light S each are continuous light. FIG. 2C shows a time waveform of the P-polarized light component L2 of the interference light L in the case where the reference light R and the signal light S each are continuous light. Note that a phase difference between the S-polarized light component L1 and the P-polarized light component L2 as shown in FIGS. 2B and 2C is 90°.

FIG. 2D shows a time waveform of the S-polarized light component L1 of the interference light L in the case where the light beam from the broad-band light source 2 is subjected to the intensity modulation as shown in FIG. 2A (this corresponds to FIG. 2B). FIG. 2E shows a time waveform of the P-polarized light component L2 of the interference light L in the case where the light beam from the broad-band light source 2 is subjected to the intensity modulation as shown in FIG. 2A (this corresponds to FIG. 2C). A phase difference between the S-polarized light component L1 and the P-polarized light component L2 as shown in FIGS. 2D and 2E is 90°.

The CCD 21 detects the S-polarized light component L1 having the time waveform shown in FIG. 2D. The light beam from the broad-band light source 2 is a light pulse of a rectangular train having the frequency $f_m$ and a duty of 50°. When a difference between the modulation frequency fm and the beat frequency $f_D$ of the interference light L ($\delta f = |f_m - f_D|$) is sufficiently smaller than a response frequency of the CCD 21 serving as the storage type photo sensor, a detection signal of the S-polarized light component L1 which is outputted from the CCD 21 becomes proportional to the amount of photo charge stored for a detection period. Therefore, the detection signal is expressed by the following expression (for example, see M. Akiba, K. P. Chan, and N. Tanno, Japanese Journal of Applied Physics, Vol. 39, L1194 (2000)).

$$S_1(t) = \langle K_1 m(t) i_1(t) \rangle \tag{8}$$

$$K_1 \left[ \frac{1}{2} I_{ss} + \frac{1}{2} I_{rs} + \frac{2}{\pi} \sqrt{I_{ss} I_{rs}} \cos(2\pi \delta f t + \beta) \right]$$

Here, <·> indicates a time average produced by a storage effect of the CCD 21. In addition, $K_1$ indicates photo detection efficiency including reflectance of the polarization beam splitter 11 and a photoelectric conversion rate of the CCD 21, m(t) indicates a function for modulating the output intensity of the broad-band light source 2 (function indicating a rectangular pulse), and $\beta$ indicates an initial phase value for measurement. As is apparent from the expression (8), the detection signal outputted from the CCD 21 includes the term related to an amplitude $\sqrt{(I_{ss} I_{rs})}$ of the S-polarized light component L1 of the interference light L and a phase ($2\pi\delta f t + \beta$) thereof in addition to the term related to the intensity of the signal light S and the term related to the intensity of the reference light R (background light component).

Similarly, the CCD 22 detects the P-polarized light component L2 having the time waveform shown in FIG. 2E and outputs a detection signal as expressed by the following expression.

$$S_2(t) = K_2 \left[ \frac{1}{2} I_{sp} + \frac{1}{2} I_{rp} + \frac{2}{\pi} \sqrt{I_{sp} I_{rp}} \sin(2\pi \delta f t + \beta) \right] \quad (9)$$

Here, $K_2$ indicates photo detection efficiency including transmittance of the polarization beam splitter 11 and a photoelectric conversion rate of the CCD 22.

Next, calculation processing of the signal intensity of the interference light L based on the detection signals (expressed by the expressions (8) and (9)) outputted from the CCDs 21 and 22 will be described.

Because the reference light R is converted to the circularly polarized light by the wavelength plate 7, it can be considered that an intensity $I_{rs}$ of the S-polarized light component $E_{rs}$ of the reference light R is equal to an intensity $I_{rp}$ of the P-polarized light component $E_{rp}$ thereof (this indicates $I_{rs}=I_{rp}=I_r$).

On the other hand, it is assumed that the reflection light of the signal light S on the object to be measured O does not significantly depend on the polarization characteristic of the incident light thereof, so it can be considered that an intensity $I_{ss}$ of the S-polarized light component $E_{ss}$ of the signal light S is equal to or close to the intensity $I_{sp}$ of the P-polarized light component $E_{sp}$ thereof (this indicates $I_{ss}=I_{sp}=I_s$). Because the signal light S is scattered or absorbed in the object to be measured O, it can be assumed that the intensity thereof is generally sufficiently smaller than that of the reference light R ($I_s \ll I_r$).

The first term and the second term of the right side of each of the expressions (8) and (9) indicate the intensity of the background light. The intensity of the background light can be measured in advance or separately. For example, a light beam which is continuous light is outputted from the broadband light source 2 and detected by the CCD 21 and the like. The detected light beam is integrated for a period corresponding to one wavelength (or integral multiple thereof) and the third term (alternating current component; phase quadrature component) is cancelled. Therefore, it is possible to obtain the intensity of the background light (background light component).

The obtained background light component is divided by the intensities of the detection signals from the CCDs 21 and 22 to calculate phase quadrature components of the detection signals, that is, a phase quadrature component $S_1'(t)$ of the S-polarized light component L1 of the interference light L and a phase quadrature component $S_2'(t)$ of the P-polarized light component L2 thereof (see the following expressions).

$$S_1'(t) = K_1 \frac{2}{\pi} \sqrt{I_s I_r} \cos(2\pi \delta f t + \beta) \quad (10)$$

$$S_2'(t) = K_2 \frac{2}{\pi} \sqrt{I_s I_r} \sin(2\pi \delta f t + \beta) \quad (11)$$

When the expressions (10) and (11) are used, the amplitude of the S-polarized light component L1 of the interference light L and the amplitude of the P-polarized light component L2 thereof are expressed by the following expression.

$$\sqrt{I_r I_s} \propto \sqrt{S_1'^2 + S_s'^2} \quad (12)$$

The optical image measuring apparatus 1 according to this embodiment produces an image of a spatial phase distribution of the interference light L as follows.

Assume that, at a measurement time $t=\mu 1$, a phase quadrature component $S_1'(t_1)$ of the S-polarized light component L1 of the interference light L is detected by the CCD 21 and a phase quadrature component $S_2'(t_1)$ of the P-polarized light component L2 thereof is detected by the CCD 22. When a ratio between both the phase quadrature components is calculated, the following signal is obtained.

$$S_3 = \frac{S_2'(t_1)}{S_1'(t_1)} = \tan(2\pi \delta f t_1 + \beta) \quad (13)$$

As is apparent from the expression (13), a signal S3 expressed thereby does not depend on the amplitude of the interference light L and is composed of only phase information. In this embodiment, the S-polarized light component L1 and the P-polarized light component L2 are detected by the CCDs 21 and 22, each of which has a light receiving surface on which a plurality of pixels are two-dimensionally arranged. Therefore, a phase $\beta$ (x, y, $t_1$) of a signal detected from each of the pixels is expressed by the following expression (where (x, y) indicates coordinates of each of the pixels on the light receiving surface).

$$\beta(x, y, t_1) = \tan^{-1}\left[\frac{S_2'(x, y, t_1)}{S_1'(x, y, t_1)}\right] - 2\pi \delta f t_1 \quad (14)$$

The second term of the expression (14) is an instantaneous phase value of an alternating current signal having a frequency $\delta f$ of zero or substantially zero ($\approx 0$) at the measurement time $t_1$, so it can be considered that the phase value is maintained constant regardless of the positions of the pixels of the CCDs 21 and 22, that is, the coordinates (x, y) thereof. Therefore, for example, a difference between a reference phase $\phi$ (($x_1$, $y_1$, $t_1$) of a detection signal detected from a pixel located at a specific point ($x=x_1$, $y=y_1$) on the light receiving surface of each of the CCDs 21 and 22 and a phase of a detection signal detected from each of the pixels is obtained. Thus, it is possible to image a spatial phase difference distribution of the heterodyne signals, that is, a spatial phase difference distribution of the interference light L.

The frequency information of the interference light L can be also obtained from the phase information thereof. Assume that the phases of the interference light L (S-polarized light component L1 and P-polarized light component L2) at two measurement times $t=t_1$ and $t=t_2$ are denoted by $\beta$ (x, y, $t_1$) and $\beta$ (x, y, $t_2$). Then, the difference $\delta f$ between the beat frequency $f_D$ of the interference light L and the modulation frequency $f_m$ of the light beam from the broadband light source 2 is expressed by the following expression.

$$\delta f = \frac{1}{2\pi} \left| \frac{\beta(x, y, t_1) - \beta(x, y, t_2)}{t_1 - t_2} \right| \quad (15)$$

Because the modulation frequency $f_m$ of the light beam is known, the heterodyne frequency, that is, the beat frequency $f_D$ of the interference light L can be calculated based on the expression (10) or (11). It can be considered that the heterodyne frequency measuring method is effective for, for example, Doppler velocity measurement using a heterodyne interference method.

[Modified Example]

In the above-mentioned optical image measuring apparatus, both the structure using the frequency shifter 8 and the structure using the reference mirror 9 and the piezoelectric element 9A are described to apply the frequency shift to the reference light R. The apparatus may include only one of the structures. For example, even when an optical image measuring apparatus is produced without providing the frequency shifter 8 in order to apply the frequency shift to the reference light R only by the z-scanning of the reference mirror 9, the same measurement can be executed. When the frequency shifter 8 is to be used, it may be provided on the optical path of the signal light S. This is because it is only necessary that the frequency of the signal light S and the frequency of the reference light R at the time of superimposition be shifted relative to each other in the image measurement according to the present invention.

In the above-mentioned structure, the light beam from the broad-band light source 2 is converted to the linearly polarized light and then divided into the signal light S and the reference light R. Each of the signal light S and the reference light R may be converted to the linearly polarized light after the division of the light beam. In such a case, it is necessary to provide a polarizing plate on each of the optical path of the signal light S and the optical path of the reference light R, so the optical image measuring apparatus becomes slightly more complex than the above-mentioned structure. Therefore, the above-mentioned structure may be more suitable in practical use.

In the above-mentioned structure, the polarization characteristic of the reference light R is converted to the circular polarization. It is also possible that the signal light S is converted to the circularly polarized light and superimposed on the reference light R which is the linearly polarized light. However, as described above, the reflection light of the signal light S on the object to be measured O is slightly weaker than the reference light R. Therefore, when the wavelength plate is disposed on the optical path of the signal light S, the signal light S passing therethrough weakens. The weakening of the intensity of the signal light S including information related to the object to be measured o may affect measurement sensitivity. Thus, the above-mentioned structure in which the polarization characteristic of the reference light R is converted to the circular polarization has an advantage. Note that the same is expected in the case where the frequency shifter is disposed.

In the above-mentioned structure, the light source 31, the beam splitter 32, the fixed mirror 33, and the photo detector 34 are provided to monitor the amount of frequency shift of the reference light R and a monitoring result is fed back for the intensity modulation of the light beam. For example, when the amount of frequency shift applied to the reference light R is set, the pulse driver 35 for automatically generating a pulse signal having a frequency (substantially) equal to the set amount of frequency shift may be provided to control the intensity modulation of the light beam.

The broad-band light source 2 for emitting a continuous light beam (continuous light) and a shutter for periodically cutting off the continuous light beam instead of the pulse driver 35 for pulse-driving the broad-band light source 2 may be provided to periodically modulate the intensity of the light beam. In such a case, the shutter composes "shutter means" in the present invention and the broad-band light source 2 and the shutter compose "light beam outputting means" in the present invention. Even when such a structure is applied, only a single shutter for light beam cutoff may be provided. Therefore, as compared with a conventional structure in which a plurality of interference light beams are sampled using a plurality of shutters synchronized with each other, both the apparatus structure and the control mode can be simplified.

Figure 3:
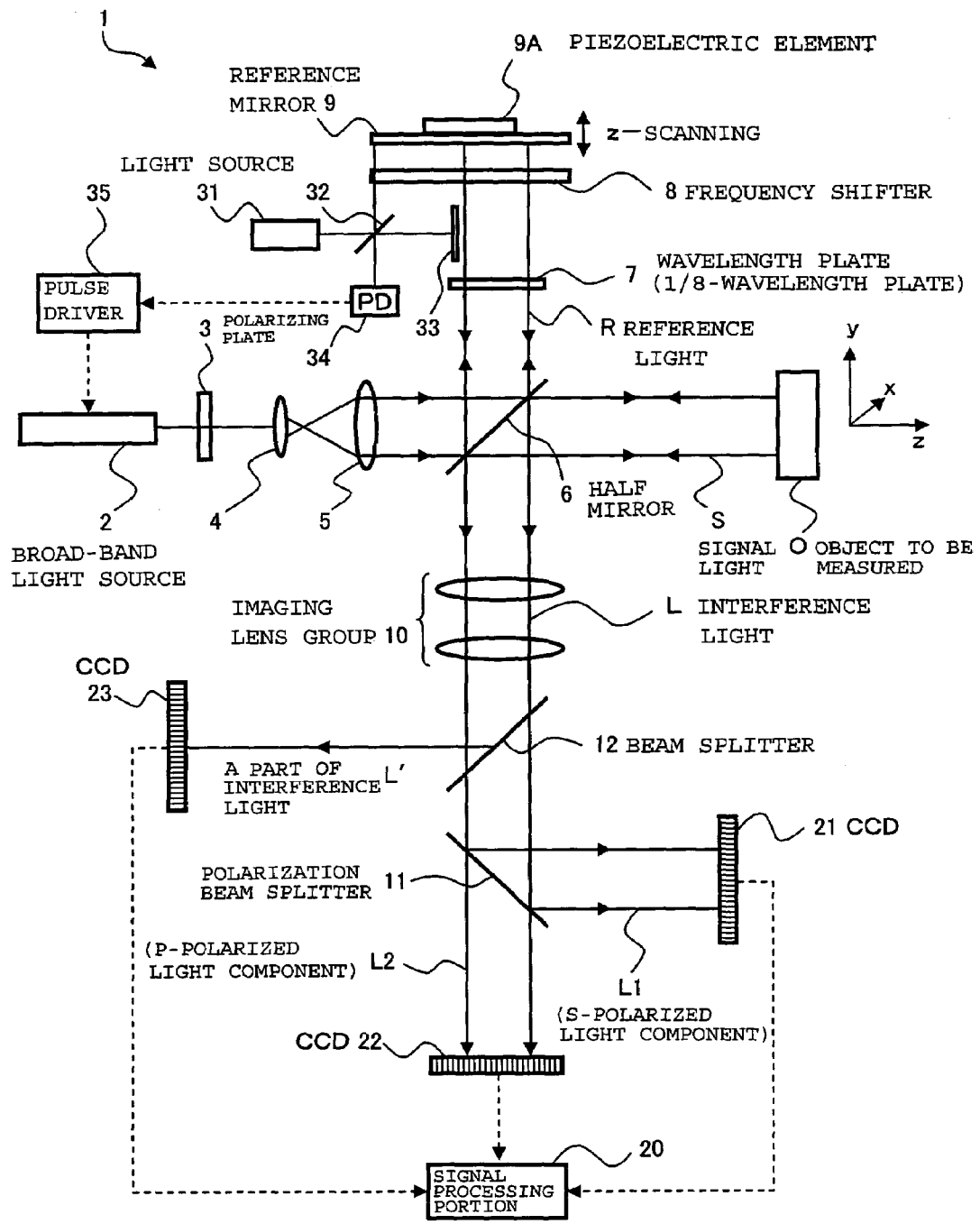
FIG. 3 is a schematic diagram showing an example of the optical image measuring apparatus according to the first embodiment of the present invention.

FIG. 3 shows a structure of an optical image measuring apparatus 1 to which means for obtaining the intensity of the background light component included in the interference light L simultaneously with the above-mentioned measurement is added. The optical image measuring apparatus 1 further includes a beam splitter 12 (dividing means) for extracting a part L' of the interference light L passing through the imaging lens group 10 by division thereof and a CCD 23 (third detecting means) disposed on an optical path of the extracted part L' of the interference light L in addition to the components of the optical image measuring apparatus 1. The reflectance of the beam splitter 12 may be small. In this case, the major part of the interference light L passes through the beam splitter 12 and is reflected in the detection using the CCDs 21 and 22.

For example, the CCD 23 detects the part L' of the interference light L during the measurement on the object to be measured O and continues to store charges. When the measurement is completed, the CCD 23 outputs a detection signal to the signal processing portion 20. The detection signal is averaged because the CCDs 23 stores charges for a long time. The signal processing portion 20 calculates a time average of the detection signal to obtain the intensity of the background light component of the interference light L.

Alternatively, the detection time of the CCD 23 is controlled to a time corresponding to an integral multiple of period of the light beam from the broad-band light source 2 and a time average of the detection signal which is obtained during the detection time is calculated, so the intensity of the background light component can be obtained.

When the structure shown in FIG. 3 is employed, the intensity of the background light of the interference light L can be obtained at the time of measuring the object to be measured O. Therefore, it is unnecessary to perform preliminary measurement for obtaining the intensity of the background light in advance.

The measurement mode for obtaining the sectional image of the object to be measured O at each depth during the z-scanning of the reference mirror 9 is described. When the measurement is performed with a state in which the position of the reference mirror 9 is fixed, it is possible to obtain a still image and a dynamic picture image of the object to be measured O at a depth with high precision.

[Operation and Effect]

As described above, in the optical image measuring apparatus 1 according to this embodiment, the intensity of the light beam from the broad-band light source 2 is periodically modulated. The signal light S and the reference light R whose polarization characteristics are different from each other are caused from the light beam and superimposed on each other to produce the interference light L. The different polarization components (S-polarized light component L1 and P-polarized light component L2) of the interference light L is extracted to calculate the signal intensity of the interference light L and the phase information thereof. Therefore, it is unnecessary to perform conventional sampling processing using the shutter, so the interference light L can be detected with high precision. Thus, the signal intensity of the interference light and the spatial phase distribution thereof can be obtained with high precision, so it is possible to effectively measure the object to be measured O.

The optical image measuring apparatus 1 according to this embodiment does not include a shutter and a structure for controlling the shutter, so the apparatus structure and the control mode can be simplified.

Second Embodiment

In the first embodiment described above, the frequency shifter 8 for applying optoelectronic frequency shift or acoustooptic frequency shift and the reference mirror 9 and the piezoelectric element 9A which are for applying Doppler frequency shift are used to shift the frequency of the reference light R. In contrast to this, in this embodiment, the frequency shift is provided only by the frequency shifter 8. The reference mirror 9 and the piezoelectric element 9A are used not for the application of Doppler frequency shift to the reference light R but for scanning of the object to be measured O in the depth direction (z-scanning).

Figure 4:
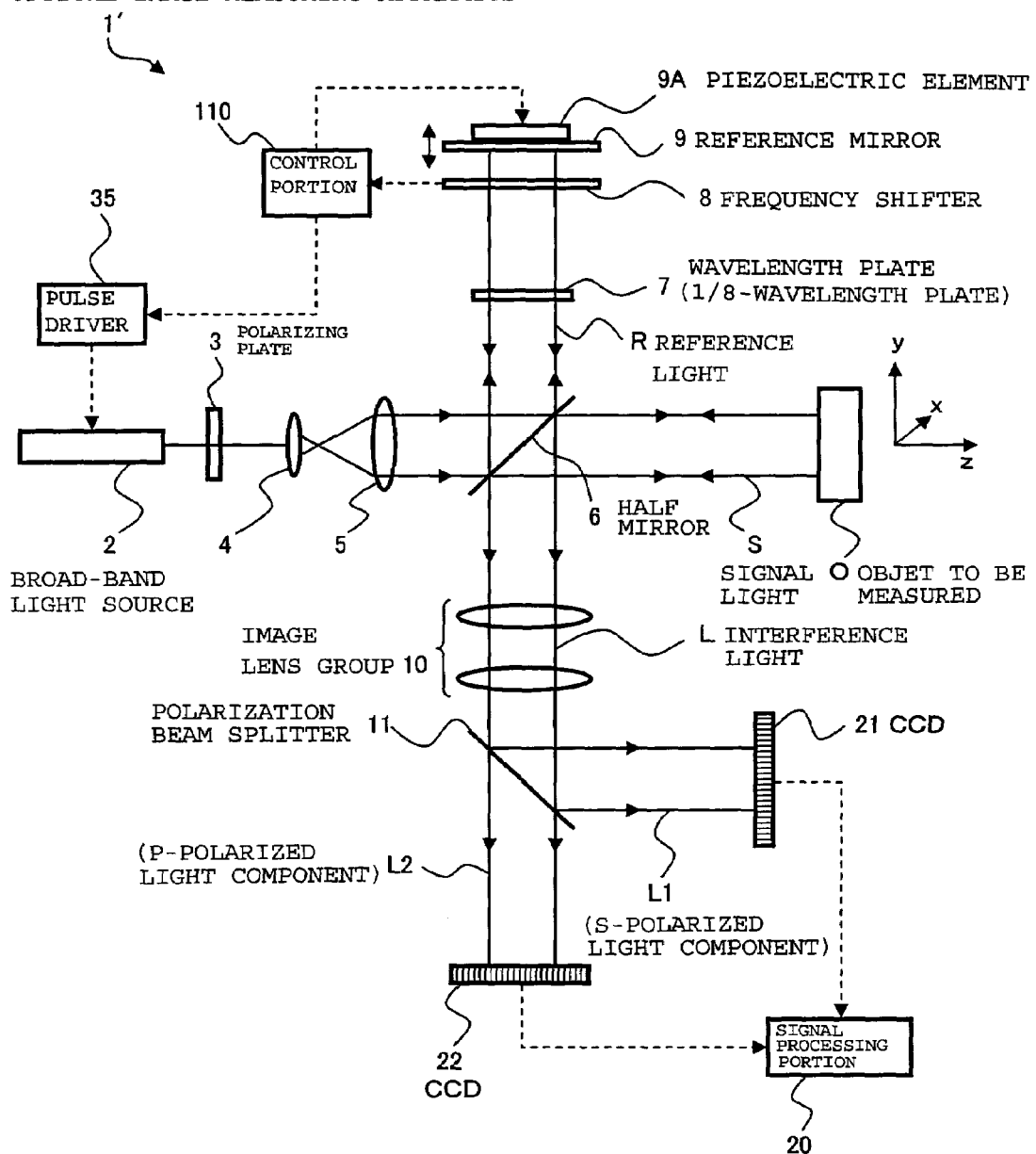
FIG. 4 is a schematic diagram showing an example of an optical image measuring apparatus according to a second embodiment of the present invention.
Figure 5:
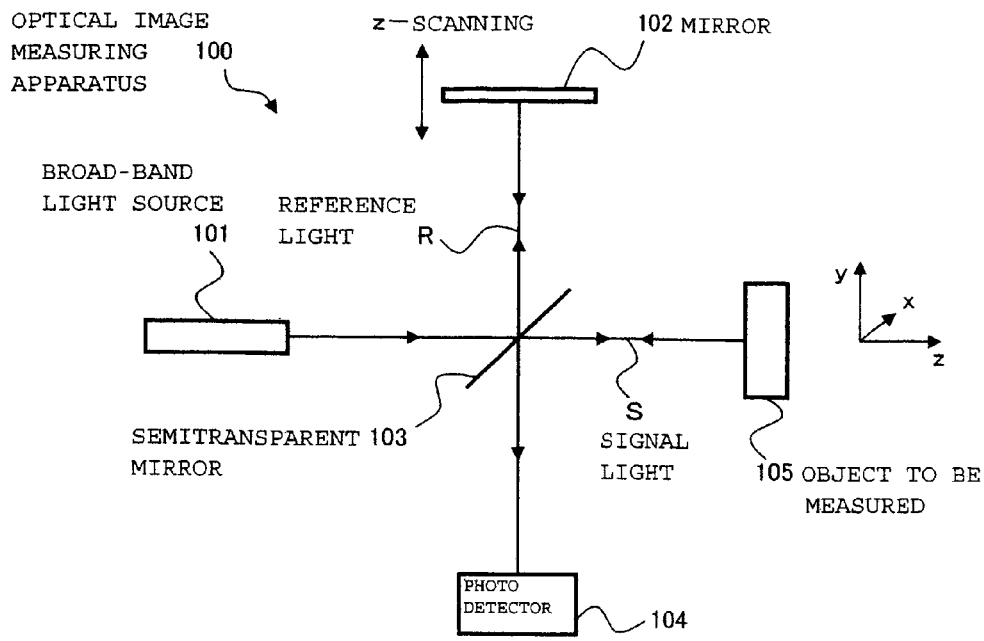
FIG. 5 is a schematic diagram showing a conventional optical image measuring apparatus.
Figure 6:
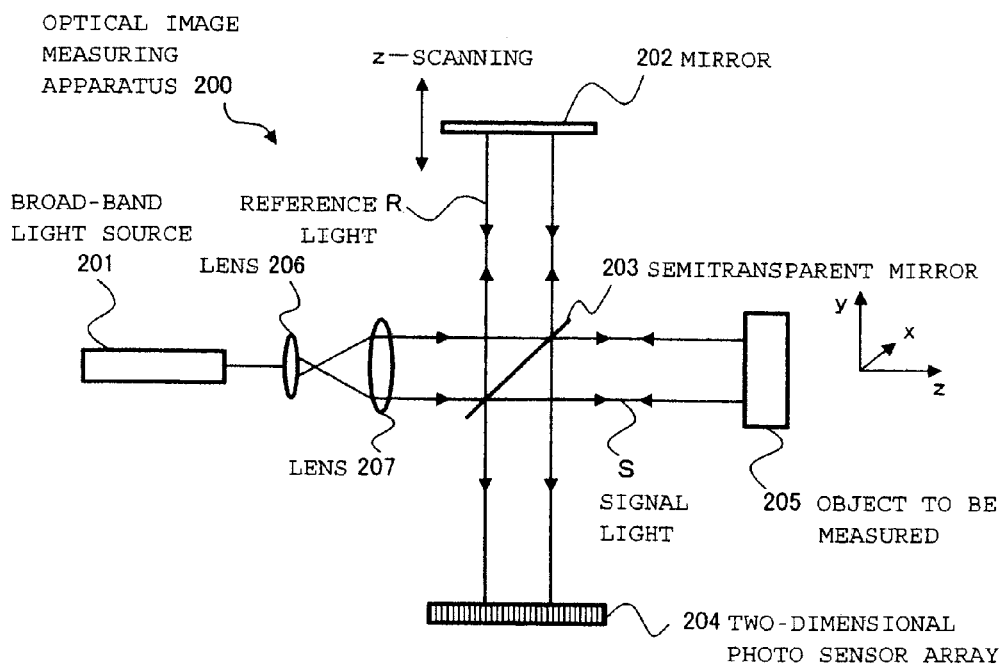
FIG. 6 is a schematic diagram showing a conventional optical image measuring apparatus.

FIG. 4 shows a schematic structure of an optical image measuring apparatus 1' according to a second embodiment of the present invention. The optical image measuring apparatus 1' has substantially the same structure as that described in the first embodiment and includes a control portion 110 for detecting the amount of frequency shift applied by the frequency shifter 8 and transmitting control signals to the pulse driver 35 and the piezoelectric element 9A. The control portion 110 composes "drive control means" in the present invention.

The control portion 110 includes a CPU, a memory, a power source circuit, and a pulse signal generating circuit. When frequency shift amount information related to the reference light R is received from the frequency shifter 8, the control portion 110 generates a pulse signal having a frequency (Af) indicated by the frequency shift amount information and outputs the pulse signal to the pulse driver 35. The pulse driver 35 generates a light source drive pulse signal having the frequency Af in response to the pulse signal having the frequency Af which is outputted from the control portion 110. The broad-band light source 2 is driven based on the light source drive pulse signal and outputs a pulsed light beam having the frequency Δf.

At this time, for example, the pulse signal outputted from the control portion 110 to the pulse driver 35 is a rectangular pulse with a duty of 50% and the pulse driver 35 outputs a rectangular light source drive pulse signal with a duty of 50% which has the same phase as that of the pulse signal. Therefore, the broad-band light source 2 outputs a rectangular light beam with a duty of 50% which has been subjected to the intensity modulation (this is the same as in the first embodiment).

The control portion 110 outputs a pulsed power source signal having the frequency Δf to the piezoelectric element 9A based on the frequency shift amount information from the frequency shifter 8. The power source signal is, for example, a rectangular pulse signal with a duty of 50% but a signal having a phase opposite to that of the pulse signal outputted to the pulse driver 35. Therefore, when the light beam is outputted from the broad-band light source 2 (intensity is high), the piezoelectric element 9A operates not to move the reference mirror 9. When the light beam is not outputted (intensity is low), the piezoelectric element 9A operates to move the reference mirror 9. That is, when the reference light R is reflected, the reference mirror 9 is stopped so as not to apply Doppler frequency shift thereto. When the reference light R is not reflected, the reference mirror 9 is controlled such that a position thereof is shifted stepwise.

According to the optical image measuring apparatus 1' that performs such control, even when the frequency of the reference light R is shifted only by the frequency shifter 8, high sensitive detection can be performed because the shutter is not used. Therefore, it is possible to effectively obtain the signal intensity of the interference light and the spatial phase distribution thereof.

It is unnecessary to provide the light source 31, the beam splitter 32, the fixed mirror 33, and the photo detector 34 which are used to monitor the amount of frequency shift of the reference light R, so the apparatus structure is simplified.

[Other Modified Examples]

The above-mentioned detailed structures are merely examples of the optical image measuring apparatus according to the present invention. Therefore, various modifications can be made without departing from the spirit of the present invention.

For example, when a wavelength plate (½-wavelength plate) is provided on the optical path of the signal light S, that is, the optical path between the half mirror 6 and the object to be measured O in the structure shown in FIG. 1, 3, or 4, it is possible to correct a tilt of the signal light S in the polarization direction thereof, which is caused by a change in phase when the signal light S passes through the object to be measured O.

The detecting means of the optical image measuring apparatus according to the present invention are not limited to the CCDs 21, 22, and 23. The detecting means may be a sensor having both a function of detecting the interference light and performing photoelectric conversion thereon and a function of storing detected charges, such as a line sensor including an integrated circuit. A one-dimensional sensor or a two-dimensional sensor may be used.

In the above-mentioned embodiments, the optical image measuring apparatus having the Michelson type interferometer is described. It is also possible to use another interferometer such as a Mach-Zehnder type interferometer (for example, see JP 3245135 B made by the inventors et al. of the present invention).

An optical fiber (bundle) used as a light guide member is provided in a part of the interferometer. Therefore, the degree of freedom of an apparatus design can be improved, the apparatus can be made compact, or the degree of freedom of location of the object to be measured can be improved (for example, see JP 3245135 B).

When the optical image measuring apparatus according to the present invention is applied in, for example, an ophthalmologic field, two-dimensional sectional images of retina and cornea can be obtained in addition to the blood flow measurement on the eye fungus. Therefore, it is possible to measure, for example, the number of endothelial cells of the cornea. Various other applications are also possible.

What is claimed is:

1. An optical image measuring apparatus, comprising:
   light beam outputting means for outputting a light beam whose intensity is periodically modulated;
   a first converting means for converting a polarization characteristic of the light beam to linear polarization;
   dividing means for dividing the light beam into signal light propagating through an object to be measured and reference light propagating through a reference object;
   a second converting means for converting a polarization characteristic of one of the signal light and the reference light, which is linearly polarized light;
   frequency shifting means for shifting a frequency of the signal light and a frequency of the reference light relative to each other by an amount substantially equal to a frequency for intensity modulation of the light beam;
   superimposing means for superimposing the signal light propagating through the object to be measured and the reference light propagating through the reference object on each other to produce first interference light, the signal light and the reference light respectively having a polarization characteristic converted by the first converting means and the second converting means in each of which the frequency is shifted by the frequency shifting means;
   extracting means for extracting a plurality of polarized light components from the produced first interference light;
   a first detecting means for detecting the polarized light components extracted from the first interference light; and
   calculating means for calculating one of a signal intensity and a phase of the first interference light based on the detected polarized light components,
   wherein an image of the object to be measured is formed based on the calculated one of the signal intensity and the phase of the first interference light.

2. An optical image measuring apparatus according to claim 1, wherein the first detecting means comprises a storage type photo sensor for detecting the polarized light components extracted from the first interference light at a predetermined response frequency.

3. An optical image measuring apparatus according to claim 1, wherein the first detecting means comprises a CCD camera.

4. An optical image measuring apparatus according to claim 2, wherein the frequency for the intensity modulation of the light beam is set such that a difference between the frequency for the intensity modulation thereof and a frequency of the first interference light becomes sufficiently smaller than a response frequency of the first detecting means.

5. An optical image measuring apparatus according to claim 1, wherein the first converting means comprises a polarizing plate for transmitting an oscillation component of the light beam in a predetermined direction.

6. An optical image measuring apparatus according to claim 1, wherein the second converting means comprises a wavelength plate for applying a phase difference between a P-polarized light component and an S-polarized light component of the one of the signal light and the reference light, which is the linearly polarized light, to convert the polarization characteristic thereof, the P-polarized light component and the S-polarized light component being orthogonal to each other.

7. An optical image measuring apparatus according to claim 1, wherein the first converting means converts the polarization characteristic of the light beam to the linear polarization in an angle direction by 45° relative to an x-axis and a y-axis of an xy-plane which are orthogonal to a propagating direction of the light beam, and
   the second converting means converts the polarization characteristic of the one of the signal light and the reference light, which is the linearly polarized light in the direction forming an angle by 45°, to circular polarization.

8. An optical image measuring apparatus according to claim 6, wherein the first converting means converts the polarization characteristic of the light beam to the linear polarization in an angle direction by 45° relative to an x-axis and a y-axis of an xy-plane which are orthogonal to a propagating direction of the light beam, and
   the second converting means converts the polarization characteristic of the one of the signal light and the reference light, which is the linearly polarized light in the direction forming an angle by 45°, to circular polarization.

9. An optical image measuring apparatus according to claim 6, wherein the extracting means extracts a P-polarized light component and an S-polarized light component which are orthogonal to each other from the first interference light.

10. An optical image measuring apparatus according to claim 7, wherein the extracting means extracts a P-polarized light component and an S-polarized light component which are orthogonal to each other from the first interference light.

11. An optical image measuring apparatus according to claim 1, wherein the reference object comprises a reference mirror having a reflective surface, which is located orthogonal to an optical path of the reference light,
    the dividing means and the superimposing means compose a half mirror tilted relative to an optical path of the outputted light beam, an optical path of the signal light, and an optical path of the reference light, and
    the object to be measured, the reference mirror, and the half mirror compose a Michelson type interferometer.

12. An optical image measuring apparatus according to claim 9, wherein the first converting means comprises a polarization plate for transmitting an oscillation component of the light beam which is oscillated in the direction forming an angle by 45° relative to the x-axis and the y-axis of the xy-plane which are orthogonal to the propagating direction of the light beam,
    the half mirror divides the light beam which is converted to the linearly polarized light by the polarization plate into the signal light and the reference light, and
    the second converting means comprises a ⅛-wavelength plate which is provided between the half mirror and the reference mirror and applies a phase difference of π/4 between a P-polarized light component and an S-polarized light component of the reference light, which are orthogonal to each other, before and after reflection on the reference mirror to convert a polarization characteristic of the reference light from the linear polarization to circular polarization.

13. An optical image measuring apparatus according to claim 10, wherein the extracting means comprises a polarization beam splitter for transmitting a P-polarized light component of the first interference light and reflecting an S-polarized light component thereof.

14. An optical image measuring apparatus according to claim 1, wherein the frequency shifting means comprises a frequency shifter provided on an optical path of the reference light.

15. An optical image measuring apparatus according to claim 11, wherein the frequency shifting means comprises a frequency shifter provided on an optical path of the reference light.

16. An optical image measuring apparatus according to claim 9, wherein the frequency shifting means comprises the reference mirror and driving means for continuously moving the reference mirror in an optical path direction of the reference light.

17. An optical image measuring apparatus according to claim 1, wherein the frequency shifting means comprises a frequency shifter provided on an optical path of the reference light, and
the optical image measuring apparatus further comprises:
driving means for moving the reference mirror in an optical path direction of the reference light; and
drive control means for controlling the driving means so as to move the reference mirror stepwise in synchronization with the intensity modulation of the light beam which is performed in the light beam outputting means.

18. An optical image measuring apparatus according to claim 10, wherein the frequency shifting means comprises a frequency shifter provided on an optical path of the reference light, and
the optical image measuring apparatus further comprises:
driving means for moving the reference mirror in an optical path direction of the reference light; and
drive control means for controlling the driving means so as to move the reference mirror stepwise in synchronization with the intensity modulation of the light beam which is performed in the light beam outputting means.

19. An optical image measuring apparatus according to claim 13, wherein the driving means comprises a piezoelectric element provided on a rear surface of the reference mirror which is opposed to the reflective surface thereof.

20. An optical image measuring apparatus according to claim 1, wherein the light beam outputting means comprises:
a laser light source for emitting laser light;
an interference optical system for dividing the emitted laser light into first laser light propagating through the frequency shifting means and second laser light propagating through a reflecting mirror which is fixedly located and superimposing the first laser light subjected to frequency shift and the second laser light reflected on the reflecting mirror on each other to produce second interference light;
a second detecting means for detecting the produced second interference light and outputting an electrical signal having a frequency equal to that of the detected second interference light;
pulse generating means for generating a pulse signal having a frequency equal to that of the outputted electrical signal; and
a light source which is driven based on the generated pulse signal and outputs a pulsed light beam having a pulse repetition frequency equal to that of the generated pulse signal.

21. An optical image measuring apparatus according to claim 10, wherein the light beam outputting means comprises:
a laser light source for emitting laser light;
an interference optical system for dividing the emitted laser light into first laser light propagating through the frequency shifting means and second laser light propagating through a reflecting mirror which is fixedly located and superimposing the first laser light subjected to frequency shift and the second laser light reflected on the reflecting mirror on each other to produce second interference light;
a second detecting means for detecting the produced second interference light and outputting an electrical signal having a frequency equal to that of the detected second interference light;
pulse generating means for generating a pulse signal having a frequency equal to that of the outputted electrical signal; and
a light source which is driven based on the generated pulse signal and outputs a pulsed light beam having a pulse repetition frequency equal to that of the generated pulse signal.

22. An optical image measuring apparatus according to claim 1, wherein the light beam outputting means comprises:
pulse generating means for generating a pulse signal having a frequency substantially equal to an amount of shift of the frequency shifted by the frequency shifting means; and
a light source which is driven based on the pulse signal and outputs a pulsed light beam.

23. An optical image measuring apparatus according to claim 10, wherein the light beam outputting means comprises:
pulse generating means for generating a pulse signal having a frequency substantially equal to an amount of shift of the frequency shifted by the frequency shifting means; and
a light source which is driven based on the pulse signal and outputs a pulsed light beam.

24. An optical image measuring apparatus according to claim 1, wherein the light beam outputting means comprises:
a light source for emitting a continuous light beam, and shutter means for periodically cutting off the emitted continuous light beam.

25. An optical image measuring apparatus according to claim 16, wherein the light source comprises one of a super luminescent diode and a light emitting diode.

26. An optical image measuring apparatus according to claim 17, wherein the light source comprises one of a super luminescent diode and a light emitting diode.

27. An optical image measuring apparatus according to claim 1, wherein the light beam comprises low coherent light.

28. An optical image measuring apparatus according to claim 16, wherein the light beam comprises low coherent light.

29. An optical image measuring apparatus according to claim 1, further comprising:
separating means for separating a part of the first interference light produced by the superimposing means therefrom; and
a third detecting means for detecting the separated part of the first interference light,
wherein the calculating means calculates a signal intensity of background light component of the first interference light based on the part of the first interference light which is detected by the third detecting means.

30. An optical image measuring method, comprising:

outputting a light beam whose intensity is periodically modulated;

converting a polarization characteristic of the output light beam to linear polarization;

dividing the converted light beam into signal light propagating through an object to be measured and reference light propagating through a reference object;

converting a polarization characteristic of one of the signal light and the reference light, which is linearly polarized light;

shifting a frequency of the signal light and a frequency of the reference light relative to each other by an amount substantially equal to a frequency for intensity modulation of the light beam;

superimposing the signal light propagating through the object to be measured and the reference light propagating through the reference object on each other to produce first interference light, each of which has a polarization characteristic converted in the steps of conversion in which the frequency is shifted by the step of frequency shifting;

extracting a plurality of polarized light components from the produced interference light;

detecting the polarized light components extracted from the interference light;

calculating one of a signal intensity and a phase of the first interference light based on the detected polarized light components; and forming and displaying an image of the object to be measured based on the calculated one of the signal intensity and the phase of the first interference light.

* * * * *

UNITED STATES PATENT AND TRADEMARK OFFICE
CERTIFICATE OF CORRECTION

PATENT NO. : 7,307,733 B2  
APPLICATION NO. : 11/194482  
DATED : December 11, 2007  
INVENTOR(S) : Kinpui Chan et al.

It is certified that error appears in the above-identified patent and that said Letters Patent is hereby corrected as shown below:

On Title Page should read item (73) Assignee: Kabushiki Kaisha Topcon, Tokyo (JP)

Signed and Sealed this

Sixth Day of May, 2008

JON W. DUDAS  
*Director of the United States Patent and Trademark Office*